United States Patent
Takahara et al.

(10) Patent No.: US 6,735,380 B2
(45) Date of Patent: May 11, 2004

(54) LENS-FITTED PHOTO FILM UNIT WITH FLASH DEVICE AND METHOD OF FLASH LIGHTING THEREBY

(75) Inventors: Shigeki Takahara, Minami-Ashigara (JP); Manabu Tobise, Minami-Ashigara (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 0 days.

(21) Appl. No.: 10/076,377

(22) Filed: Feb. 19, 2002

(65) Prior Publication Data

US 2002/0118962 A1 Aug. 29, 2002

(30) Foreign Application Priority Data

Feb. 19, 2001 (JP) ........................................ 2001-041407

(51) Int. Cl.[7] ........................... G03B 17/02; G03B 15/06
(52) U.S. Cl. ........................................... 396/6; 396/200
(58) Field of Search ............................ 396/6, 155, 176, 396/200; 362/3, 16

(56) References Cited

U.S. PATENT DOCUMENTS

| 4,304,479 A | * | 12/1981 | Van Allen | 396/200 |
| 5,160,192 A | * | 11/1992 | Sugawara | 362/16 |
| 5,390,084 A | * | 2/1995 | Ohtake et al. | 362/16 |
| 5,406,343 A | * | 4/1995 | Stephenson | 396/200 |
| 5,852,751 A | * | 12/1998 | Kawabata et al. | 362/16 |
| 6,102,547 A | * | 8/2000 | Matsuoto et al. | 362/16 |
| 6,480,679 B1 | * | 11/2002 | Ishida et al. | 396/200 |

* cited by examiner

Primary Examiner—Christopher E Mahoney
(74) Attorney, Agent, or Firm—Young & Thompson (57) ABSTRACT

An intensity of a flashlight projected from a flashlight projector is at the maximum outside a photographic area. A plate protuberance is formed in a center of an inner face of a protector. A part of the flashlight emitted from a flash tube is reflected on upper and lower faces of the plate protuberance so as to tend into the outside of the photographic area. The intensity of the flashlight emitted into a center of the photographic area is deflected on a wedge of an end of a plate protuberance. Thus, distribution pattern of the flashlight is changed by the plate protuberance, and the intensity of the flashlight becomes 1.0–1.5 LV smaller in the center of the photographic area than on upper and lower limits thereof. A main subject in a smaller distance is not overexposed, and a background in a larger distance is not underexposed.

13 Claims, 7 Drawing Sheets

LENS-FITTED PHOTO FILM UNIT WITH FLASH DEVICE AND METHOD OF FLASH LIGHTING THEREBY

BACKGROUND OF THE INVENTION

1. Field of the Invention

The present invention relates to a lens-fitted photo film unit with a flash device and a method of flash lighting thereby.

2. Description Related to the Prior Art

The applicant produces and sells a lens-fitted photo film unit in which an unexposed filmstrip is preloaded. There is a type of the lens-fitted photo film unit, which has a flash device so as to take pictures in the night or the room. The flash device of the lens-fitted photo film unit should have a simple structure as the lens-fitted photo film unit can be readily bought.

The flash device is constructed of a flash circuit board with a flash circuit mounted thereon for controlling charge and discharge, and a flashlight projector unitized and attached to the flash circuit board for projecting a flashlight. The flashlight projector is substantially constructed of a flash tube, a reflector and a transparent protector. The flash tube emits a flashlight corresponding to a trigger signal. The reflector reflects the flashlight such that the flashlight projector may project the flashlight forwards. The protector is disposed to protect the flash tube and the reflector, and determine a characteristic of lighting distribution of the flashlight. In order to increase an effect of the flashlight and project the flashlight at the same strength in a photographic area, the protector makes a projection axis of the flashlight projector coincide with a center of the photographic area.

However, if a flashlight photograph is carried out with the lens-fitted photo film unit, the subjects in a smaller distance, for example persons in a center of the photographic area, are often overexposed, and the backgrounds to be a side of the area are underexposed due to larger distance. In order to improve the quality of pictures, an automatic flash device is used. However, provision of a photometric element and control circuits increases the cost for production of the lens-fitted photo film unit becomes higher. Further, the effect of the automatic flash device is not so much.

When the flashlight photograph is carried out with a camera, it is known to softly illuminate the subject in effect of a bounce light. In this case, a direction in which the flashlight projector is tended is manually adjusted, and an exposure amendment must be made through operating an exposure adjustment member provided for the camera, depending on the direction in which the flashlight is projected.

However, for low cost of production the lens-fitted photo film unit, it is difficult to provide the exposure adjustment member and the swingable structure of the flashlight projector.

SUMMARY OF THE INVENTION

An object of the present invention is to provide a lens-fitted photo film unit that is produced at a low cost and a method of flash lighting thereby.

Another object of the present invention is to provide a lens-fitted photo film unit and a method of flash lighting thereby such that a subject in a center of a photographic area may not be overexposed.

A still another object of the present invention is to provide a lens-fitted photo film unit and a method of flash lighting thereby such that a background may not be underexposed.

The last object of the present invention is to provide a lens-fitted photo film unit so as to obtain the effect of the bounce light to a subject in a larger distance when a flashlight photograph is carried out in a room.

The above and other objects are achieved while a flashlight projector projects a flashlight such that an intensity of the flashlight may be at the maximum above and/or below a photographic area. Preferably, the intensity of the flashlight is 1.0–1.5 LV higher on upper and/or lower limits of a photographic area than in a center thereof. In the flashlight projector, a flash tube is disposed on a projection axis of the flashlight projector in an inner side of a reflector formed in a nearly half-elliptical shape. To a front side of the reflector is attached a protector.

In the present invention, the protector is provided with a regulation portion for determining a distribution of the flashlight. The regulation portion reflects a part of the flashlight emitted into a center of the photographic area such that the part of the flashlight may tend to an outside of the photographic area, and the intensity of the flashlight may be decreased in the center of the photographic area. In another embodiment of the present invention, a distance between the protector and the flash tube is larger than an opening width of the reflector. In a still another embodiment, the projection axis of the flashlight projector is inclined upwards or downwards.

In the lens-fitted photo film unit of the present invention, an ISO sensitivity of a used filmstrip, an exposure condition, and the intensity of the flashlight are previously determined. Accordingly, if the distribution of the flashlight is adjusted, the exposure amount can be higher on upper and lower edges of a frame on the filmstrip than in the center thereof. Thus the main subject that is usually photographed in the center of the frame is not overexposed, and the background in upper and lower sides of the frame is not underexposed. Further, a scene is three-dimensionally photographed in the flashlight in a room, as the flashlight reflects on a ceiling, a floor and a wall such that a depth to the main subject may be clearer, and the background can be softly illuminated in the bounce light. As the present invention has a simple structure, the cost for production does not increase.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
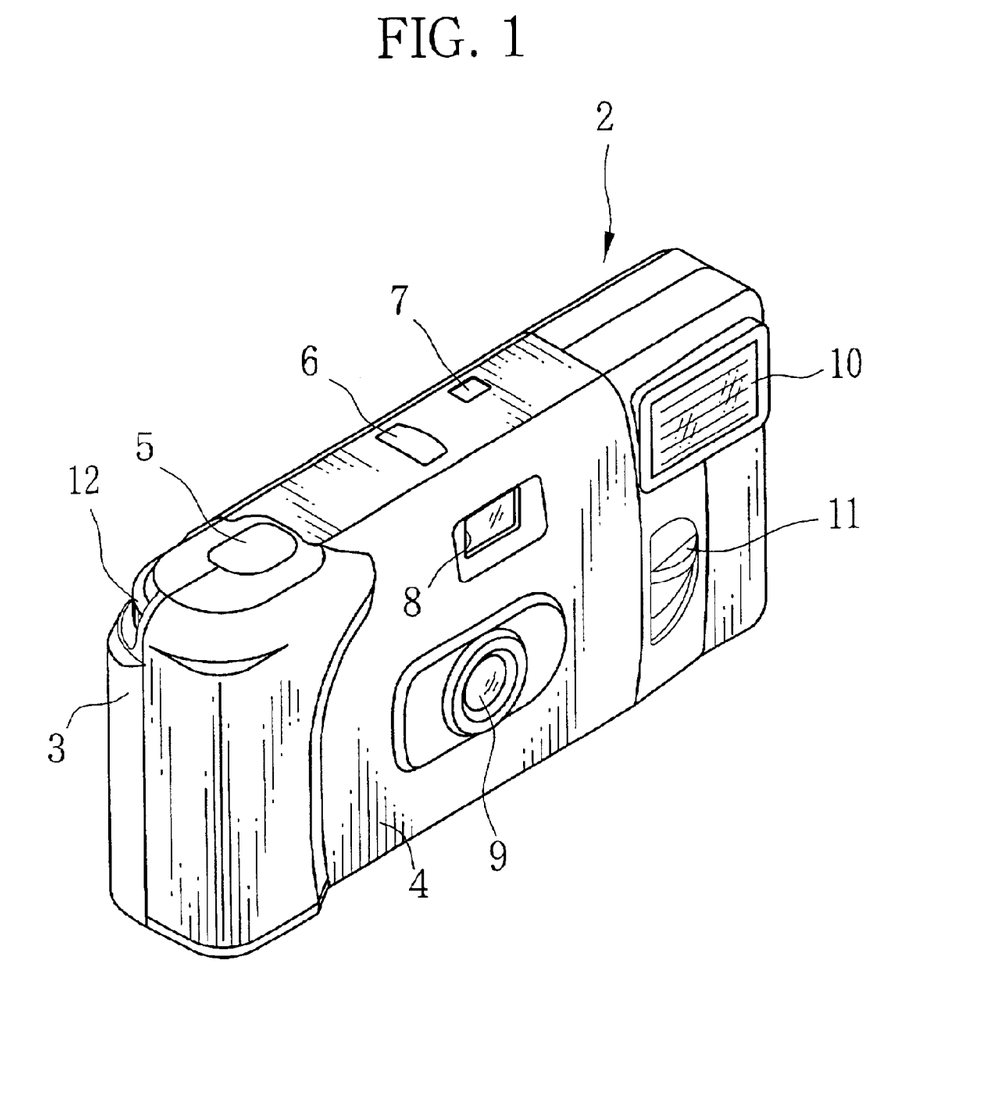
FIG. 1 is a front perspective view of a lens-fitted photo film unit with a flash device of the present invention.

In FIG. 1, a lens-fitted photo film unit (hereafter film unit) 2 includes a unit body 3 and a wrapper 4 wrapping the unit body 3.

In the unit body 3, a filmstrip is previously loaded and photographic mechanisms are assembled. A top face of the unit body 3 is provided with a shutter button 5, a film counter window 6 and a light guide 7. A front face of the unit body 3 is provided with a viewfinder 8, a taking lens 9, a flashlight projector 10 and a slidable charging switch 11. On a rear face of the unit body 3, there is a winding wheel 12.

The wrapper 4 is made of paper or film, and an adhesive agent is applied to a rear surface thereof for wrapping the unit body 3. The wrapper 4 has openings from which the film counter window 6, the viewfinder 8, the taking lens 9 and the like appear. On the wrapper 4, a method and cautions for using the film unit 2 is printed.

Figure 2:
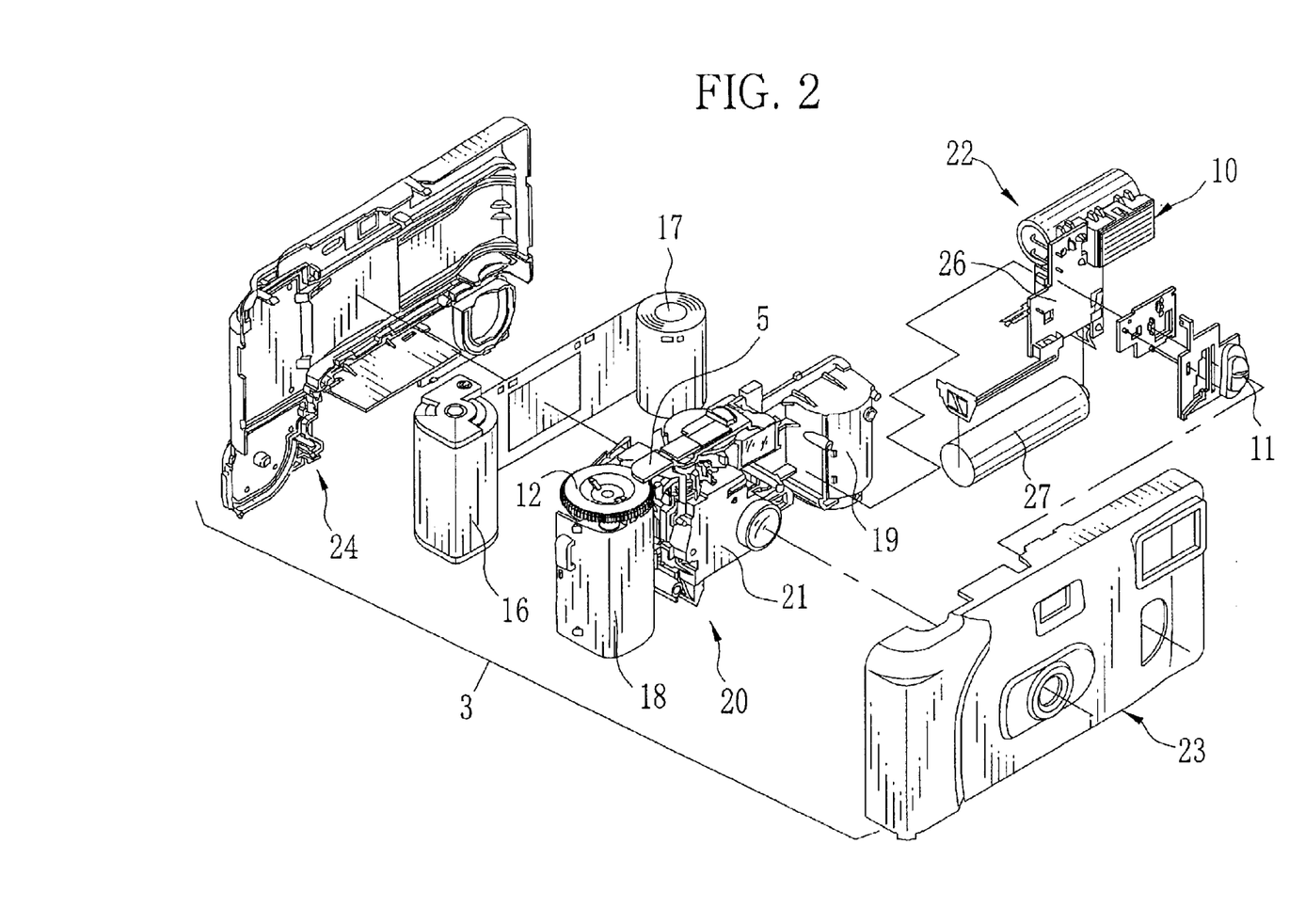
FIG. 2 is an enlarged exploded perspective view of the lens-fitted photo film unit illustrated in FIG. 1.

In FIG. 2 the unit body 3 is constituted of a basic portion 20 made of plastics, an exposure unit (or exposure section) 21, a flash device 22, a front cover 23 and a rear cover 24. In the basic portion 20, there are a cartridge chamber 18 for containing a film cartridge 16 and a film roll chamber 19 for containing a roll of a filmstrip 17. The exposure unit 21 and the flash device 22 are attached to a front side of the basic portion 20. The front and rear covers 23 and 24 are made of plastics and cover the basic portion 20 from front and rear sides respectively. The exposure unit 21 is constituted of mechanisms necessary for photograph, for example a shutter mechanism, a film counter mechanism, and a film winding stop mechanism, and has craws for engaging with the basic portion 20.

At a top of the cartridge chamber 18, a winding wheel 12 is disposed. When the winding wheel 12 is rotated, the filmstrip 17 is wound, and a film counter plate under the film counter window 6 rotates to indicate a next smaller number. When the filmstrip 17 is wound for a length of one exposed frame, the film winding stop mechanism is actuated to lock the winding wheel 12.

While winding the filmstrip 17, a shutter is set in a charged condition. When the shutter button 5 is pressed, shutter blades (not shown) of a photographing mechanism are opened and closed so as to carry out an exposure of the filmstrip 17, and a lock of the winding wheel 12 is released. The operations above described for winding the filmstrip 17 and pressing the shutter button 5 are repeated and the exposed filmstrip 17 is wound into the film cartridge 16.

Figure 3:
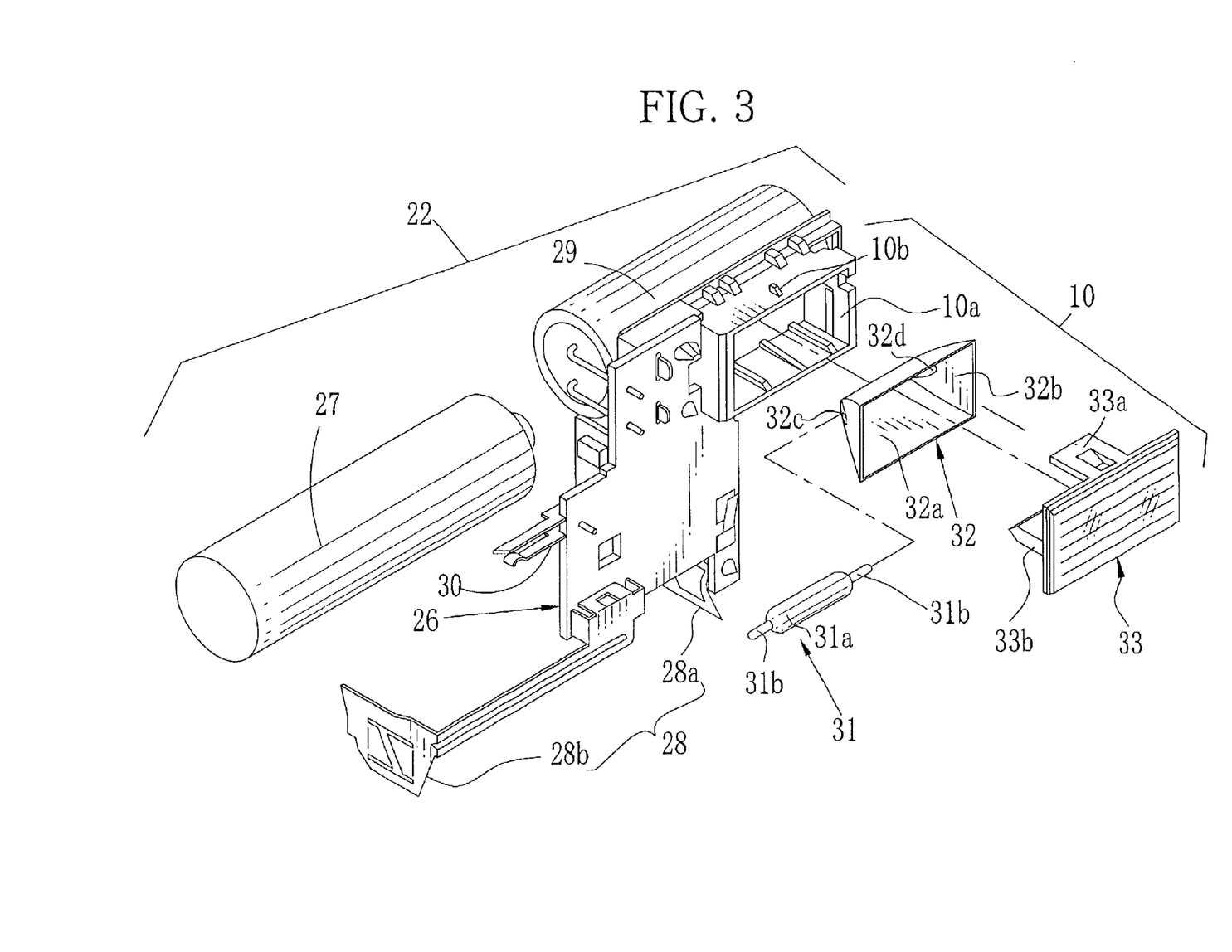
FIG. 3 is an exploded perspective view of a flash device.

In FIG. 3, the flash device 22 includes a circuit board 26, the flashlight projector 10 and a dry battery 27. The circuit board 26 is provided with a battery holder 28 consisting of positive and negative contact segments 28a and 28b for holding the dry battery 27 as a power source of the flash device 22. A backside of the circuit board 26 is provided with a main capacitor 29 used for charging. When in the main capacitor 29 the charging is completed, an LED mounted on the circuit board 26 emits an indication light at a predetermined interval.

Note that an end of the circuit board 26 is provided with a synchronized switch 30 that closes and opens in accordance with the moving of the shutter blade. When the shutter blade is opened, the synchronized switch 30 is just turned on. Then, an electric current flows in a trigger coil, and a voltage thereof reaches to thousands–tens of thousands V such that the flashlight may be projected from the flashlight projector 10 towards a photographic area (or subject).

The flashlight projector 10 includes a reflector case 10a attached to the circuit board 26 with craws (not shown), a flash tube 31 as a light source of the flashlight, a reflector 32 and a transparent protector 33.

The flash tube 31, as already known, has a cylindrical tube body 31a in which xenon gas is enclosed, and two tube ends 31b each of which contains a terminal biased at a predetermined voltage by the main capacitor 29. When a high voltage, for example 4 kV, is applied to a surface of the tube body 31a, the xenon gas therein is ionized. The ionized xenon gas lowers the resistance between the terminals in the tube ends 31b. Thus, the main capacitor 29 discharges in the tube body 31a to emit the flashlight.

The reflector 32 is a thin plate made of such as an aluminum plate, and constructed of a concave portion 32a and two side plates 32b. The concave portion 32a has a nearly half-elliptical shape symmetrical with respect to a projection axis L (see FIG. 4) of the flashlight projector 10 to open in a front side and surround the tube body 31a from back, top and bottom sides thereof. In the side plates 32b, holes 32c and 32d are respectively formed for inserting the tube body 31a therein. Thereby a surface of the tube body 31a contacts the concave portion 32a of the reflector 32. Accordingly, the reflector 32 can be used for applying the trigger voltage to the flash tube 31. Inner faces of the concave portion 32a and the side plates 32b reflect the flashlight emitted from the flash tube 31 to project it at a predetermined characteristic of lighting distribution through the protector 33 forwards.

The reflector case 10a is made of plastics, and has holding portions for clamping both of the tube ends 31b at positions confronting the holes 32c and 32d of the side plates 32b. When the both tube ends 31b are clamped, the reflector 32 is fixed to the reflector case 10a. On one of side faces of the reflector case 10a, an engage claw and a pin (not shown) are formed and used for attachment of the flashlight projector 10 to the circuit board 26.

Projecting pattern are formed on a front or a rear face of the protector 33 to adjust a projection angle of the flashlight. An arm portion 33a is integrally formed on the rear face of the protector 33. While the arm portion 33a is engaged with an engage claw 10b formed on the reflector case 10a, the protector 33 is attached to the reflector case 10a and prevents dusts from intruding in the film unit 2.

Figure 4:
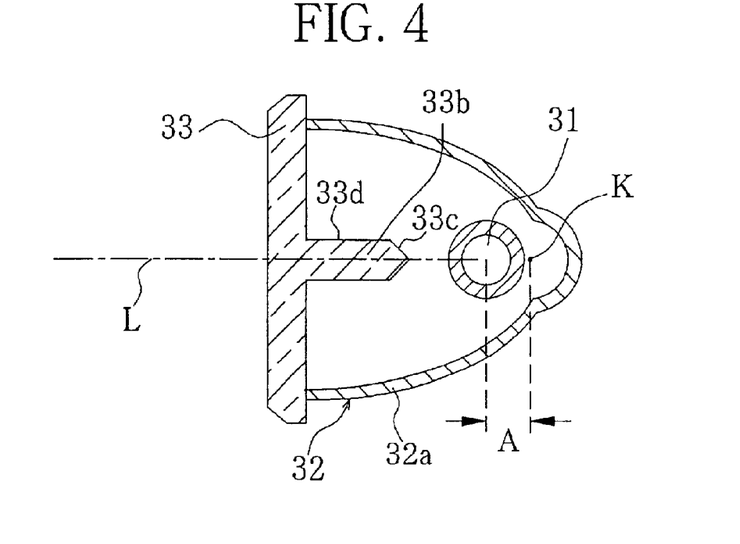
FIG. 4 is a vertical sectional view of a flashlight projector.

As shown in FIG. 4, the flash tube 31 is disposed at a distance A forwards from the focal point K of the concave portion 32a along a projection axis L. In the embodiment, A=1.0 mm. On a center of the rear face of the protector 33, a plate protuberance 33b is formed symmetrically with respect to the projection axis L of the flashlight projector 10. The plate protuberance 33b is almost as long as the flash tube 31 and parallel to the flash tube 31. Further, a surface of the plate protuberance 33b is a mirror surface in order to increase the reflectivity. At an end portion 33c of the plate protuberance 33b, there are faces inclined to the projection axis L to reflect the flashlight emitted on the projection axis L. Accordingly, the intensity of the flashlight to be projected in a center of the photographic area is decreased. Further, a part of the flashlight reflected on a part of the reflector 32 above and below the flash tube 31 is reflected again on upper and lower faces 33d of the plate protuberance 33b.

Effects of the embodiments described above will be explained now. When the photographer sets the charging switch 11 in an ON state, the main capacitor 29 starts charging. Perceiving the indication light emitted from the LED, the photographer knows the charging of the main capacitor 29 is complete. Then the photographer presses the shutter button 5. The synchronized switch 30 turns on synchronized with opening of a shutter, and the flashlight is emitted from the flash tube 31. The flashlight illuminates a scene including the photographic area to carry out a flashlight photograph.

As the flashlight emitted along the projection axis L is reflected on the end portion 33c of the plate protuberance 33b, the intensity of the flashlight projected in the center of the photographic area is decreased. Further, the upper and lower faces 33d of the plate protuberance 33b reflect a part of the flashlight which has been already reflected on the concave portion 32a of the reflector 32. Therefore, the part of the flashlight that has been directed toward an upper side of the photographic area before reflection is projected into a lower side out of the photographic area, and the other part of the flashlight that has been directed toward the lower side of the photographic area before reflection is projected into an upper side out of the photographic area.

Figure 5:
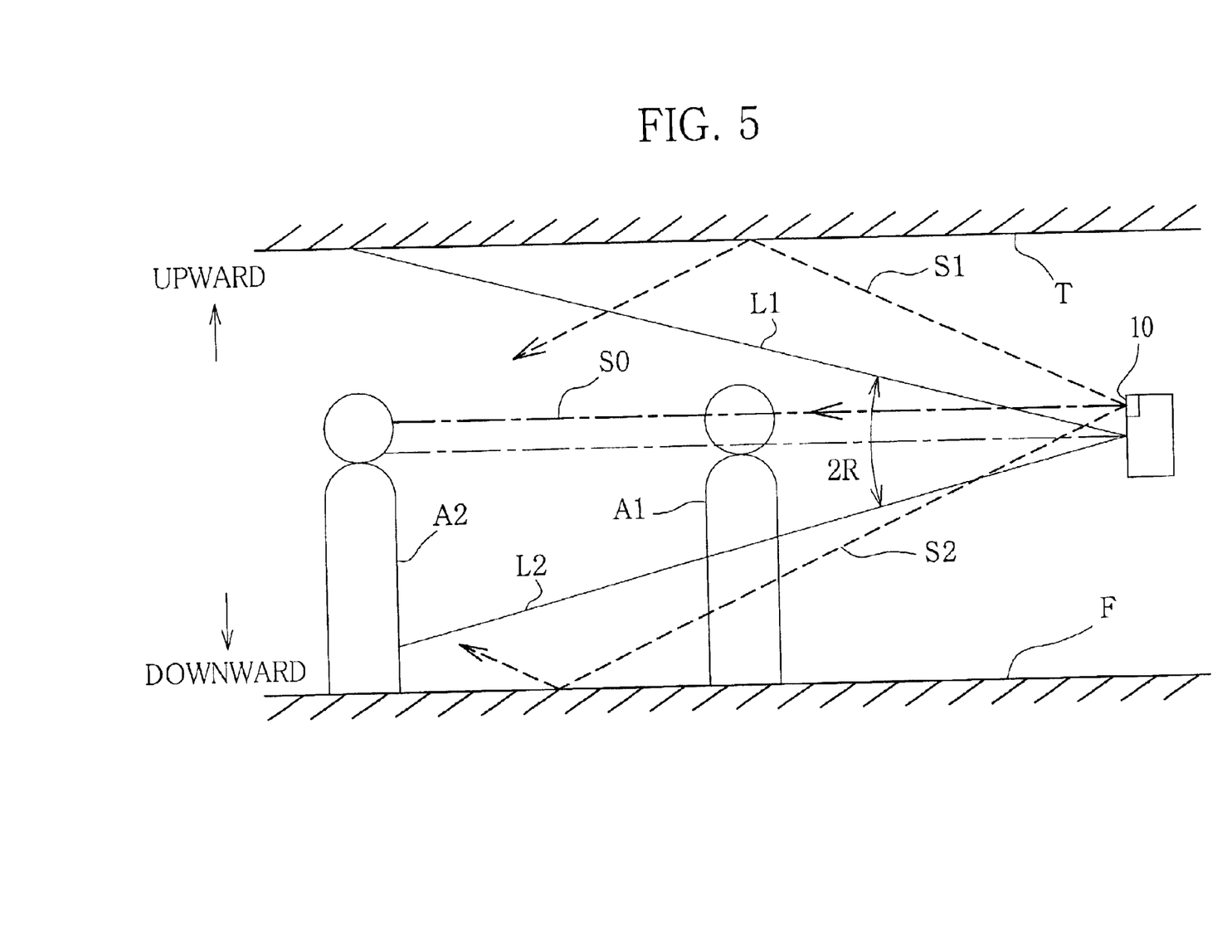
FIG. 5 is an explanatory view illustrating a situation on illumination in a room of a flashlight projected from the flashlight projector in FIG. 4.
Figure 6:
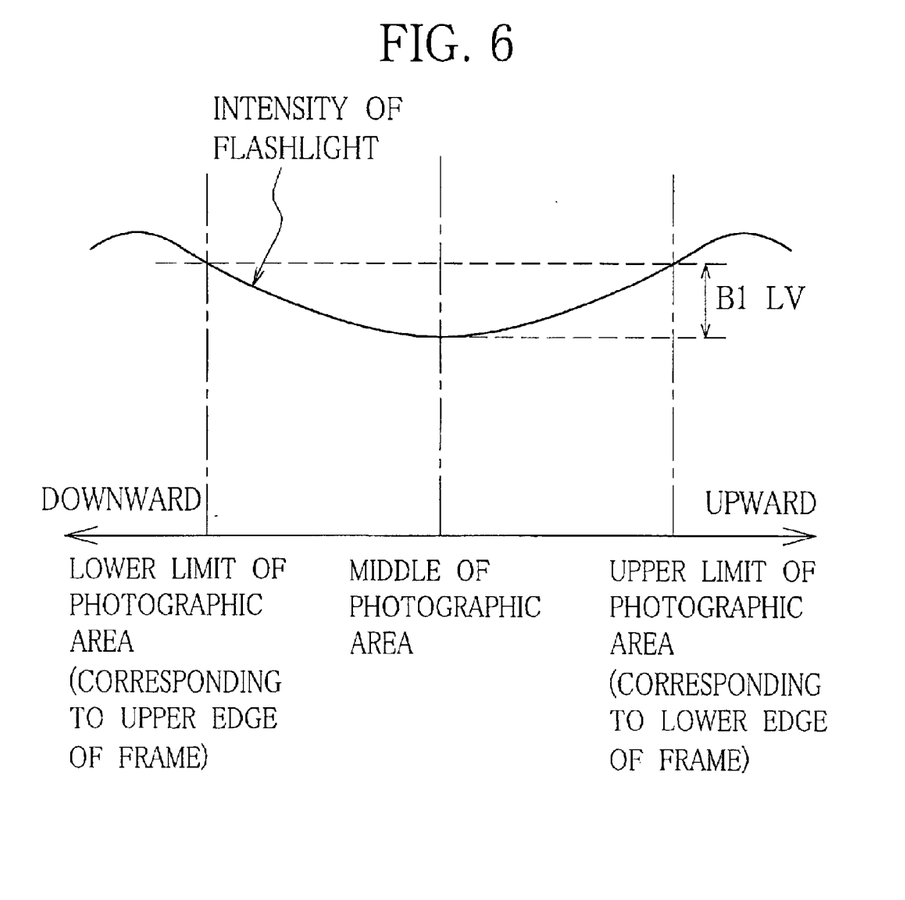
FIG. 6 is a graph illustrating a distribution of the flashlight.

FIG. 5 illustrates an illuminating situation of a main subject A1 in a smaller distance or a main subject A2 in a larger distance in the flashlight. The photographic area of the film unit 2 is determined as inside the angle 2R of view. The angle 2R is formed between imaginary lines L1, L2 respectively illustrating upper and lower limits of the photographic area. A light passing on the line L1 to the filmstrip forms an image on the lower edge of the frame, and a light passing on the line L2 to the filmstrip forms an image on the top edge of the frame. Arrows S0, S1 and S2 illustrate fluxes of the flashlight. Fluxes S1, S2 directed into the upper and lower sides out of the photographic area are larger than a flux S0 projected into the center of the photographic area. Accordingly, the main subject A1 in a smaller distance is illuminated by the weaker flux S0, and not by the stronger fluxes S1 and S2. As shown in FIG. 6, the intensity of the flashlight is at the maximum in outsides of the photographic area. Further, the intensity of the flashlight on the upper limit of the photographic area is B1 LV larger than in the center thereof. B1 is 1.0–1.5 LV, and B1=1.5 LV in the embodiment.

In FIG. 5, if there is a main subject A2 instead of the main subject A1, the flux S0 can less illuminate the main subject A2. However, the fluxes S1 and S2 are respectively reflected on a ceiling T and a floor F to become weak bounce lights. As the bounce lights illuminate the subject A2, the subject A2 is hardly shadowed. Accordingly, the flashlight photograph is carried out in an adequate illumination.

Preferably, the distance from the film unit 2 to the subject is about 3–4 m under the condition that the height from the floor F to the ceiling T is 2.5 m. In the film unit 2 in which a 135 film (24 mm×36 mm of frame size) and the taking lens of a focal length f=32 mm are usually used, the angle 2R of view is about 20.55°. Accordingly, an angle to the projection axis L, at which the flashlights S1 and S2 are projected, is preferable more than 20.55°, especially about 30°.

Thus without much increase of cost, the main subject in a smaller distance that is usually in the center of the photographic area is not overexposed, and the other subject such as the background is not underexposed. Further, if the main subject in a larger distance is photographed in a room, it is illuminated in the weak bounce light.

Figure 7:
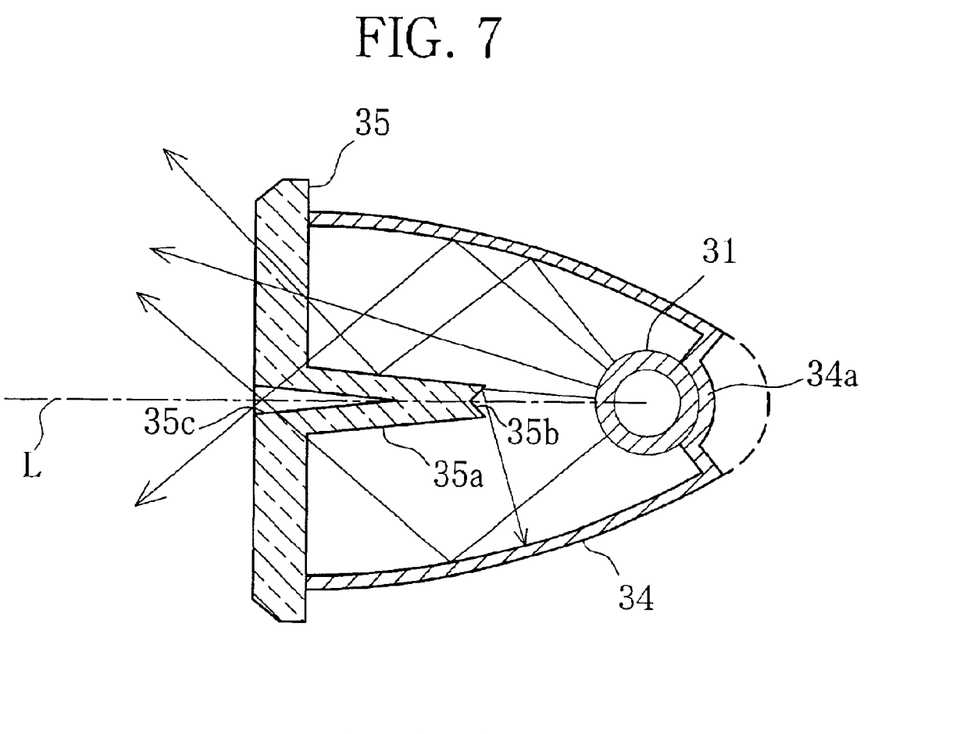
FIG. 7 is a vertical sectional view of the flashlight projector, illustrating a second embodiment of the present invention.

In order to obtain such a characteristic of lighting distribution as illustrated in FIG. 6, the flashlight projector 10 may be improved. In FIG. 7, as same as FIG. 4, the flash tube 31 is disposed forwards from the focal point of the reflector 34, and a plate protuberance 35a whose surface is mirror surface is formed on a rear face so as to confront to the flash tube 31. Upper and lower faces of the plate protuberance 35a are inclined such that it may become thinner towards an end thereof for easy extraction from a mold and easy to make the mirror surface. The inclined upper and lower faces reflect the flashlight having been reflected on the reflector 34, so as to form a peak of the intensity of the flashlight outside the photographic area.

At an end of the plate protuberance 35a, there is a groove 35b that is formed symmetrically with respect to the projection axis L. To a surface of the groove 35b, a mirror surface is formed. On a front face of the protector 35, a groove 35c is formed in order to decrease the influence of molding sink, which often happens at molding the protector 35 integrated with the plate protuberance 35a. Further, in a backside of the reflector 34, a contact portion 34a is formed and contacts to a periphery of the flash tube 31. Therefore, the reflector 34 is used as trigger electrodes, too. Further, it is noted that plates are formed so as to extend radially from the periphery of the flash tube 31 to the reflector 34 around the center of the flash tube 31.

In the flashlight projectors 10 illustrated in FIGS. 4 and 7, plate protuberances 33b and 35a are respectively formed on the protector 33 and 35, and further, the flash tube 31 is disposed forwards from the focal point of the reflector 32. Even if only one of these two structures is applied to the flashlight projector 10, there are enough effects. Namely, the intensity of the flashlight is at the maximum outside the photographic area, and the intensity of the flashlight on the upper and lower limits is about 1.0–1.3 LV.

Figure 8:
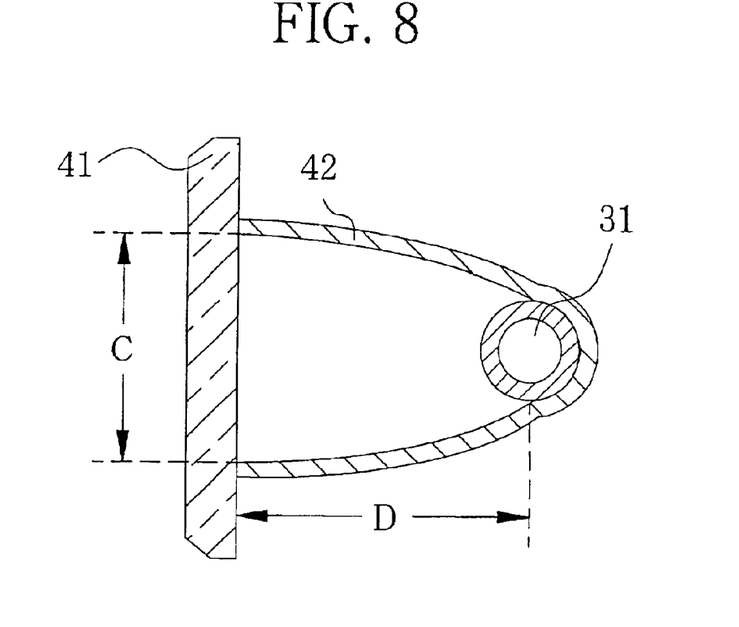
FIG. 8 is a vertical sectional view of the flashlight projector, illustrating a third embodiment of the present invention.

In order to decrease the intensity of the flashlight projected into the center of the photographic area, other embodiments are also possible. For example, as shown in FIG. 8, an opening width C of the reflector 42 may be smaller than a distance D from the reflector 42 to the flash tube 31. In this case, the flashlight becomes weaker in the center of the photographic area. Thus, the maximum intensity of the flashlight is in the outside of the photographic area, and the intensity of the flashlight on the upper and lower limits is larger by 1.0 LV than in the center of the photographic area.

Figure 9:
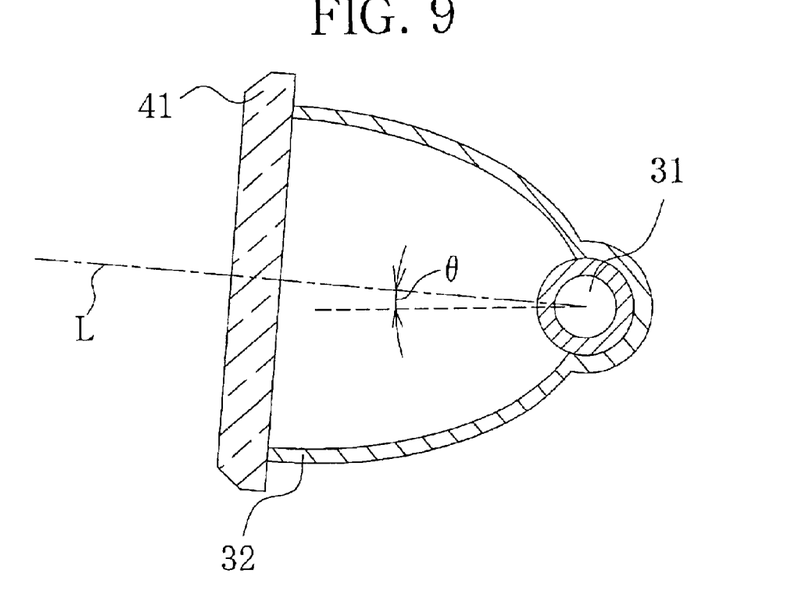
FIG. 9 is a vertical sectional view of the flashlight projector, illustrating a fourth embodiment of the present invention.
Figure 10:
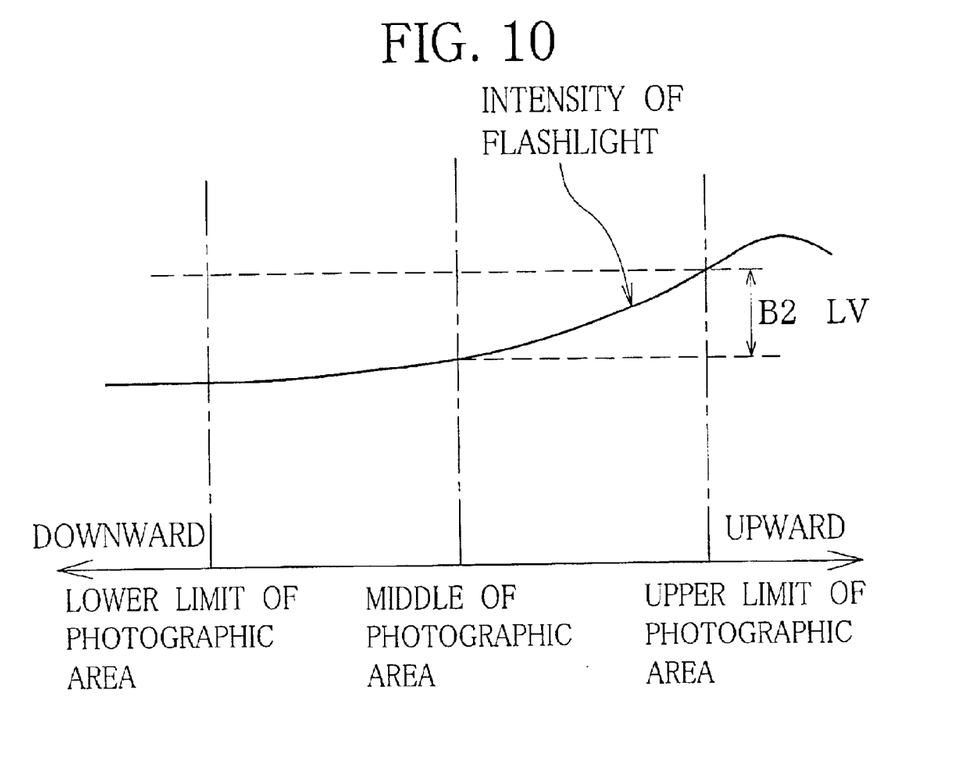
FIG. 10 is a graph illustrating a distribution of the flashlight projected from the flashlight projector in FIG. 9.

Furthermore, as shown in FIG. 9, the projection axis L of the flashlight projector 10 is inclined upwards from an imaginary horizontal line HL passing the center of the flash tube 31 at an angle θ. As shown in FIG. 10, the intensity of the flashlight is decreased in the center of the photographic area, and at the maximum over the photographic area. The intensity of the flashlight on the upper limit is B2 LV larger than in the center of the photographic area. If θ is 15°, B2 is 1.0 LV.

Further, the projection axis L of the flashlight projector 10 may be inclined downwards. Also in this case, the intensity of the flashlight is decreased in the center of the photographic area, and at the maximum below the photographic area.

In these two structures, the intensity of the flashlight near to the upper or lower limit is enough, as the flashlight is reflected on the floor, the ceiling, the walls, and the like. Accordingly, the overexposure of the subject in the center of the photographic area and the underexposure of the background near the upper or lower limit are prevented.

Various changes and modifications are possible in the present invention and may be understood to be within the present invention.

What is claimed is:

1. A lens-fitted photo film unit with a flash device, in which a filmstrip is preloaded, comprising:

an exposure section for exposing a filmstrip; and a flashlight projector included in said flash device, for projecting a flashlight so that an intensity of said flashlight may be at the maximum in outsides of the photographic area, wherein said outsides are located at least one of above and below said photographic area, and wherein the intensity of said flashlight on upper and lower limits of said photographic area is 1.0–1.5 LV larger than in a center of said photographic area.

2. A lens-fitted photo film unit claimed in claim 1, said flashlight projector comprising:

a flash tube for emitting said flashlight;

a reflector having nearly half elliptical shape for reflecting said flashlight emitted from said flash tube so as to tend forwards; and a transparent projector attached to a front side of said reflector for protecting said flash tube, wherein said flash tube is disposed forward from a focal point of said reflector on a projection axis of said flashlight projector.

3. A lens-fitted photo film unit with a flash device, in which a film strip is preloaded, comprising:

an exposure section for exposing a filmstrip; and a flashlight projector included in said flash device, for projecting a flashlight so that an intensity of said flashlight may be at the maximum in outsides of the photographic area, wherein said outsides are located at least one of above and below said photographic area, and wherein said flashlight projector comprises:

a flash tube for emitting said flashlight;

a reflector having nearly half elliptical shape, in an inner side of said reflector said flash tube being disposed on a projection axis of said flash device, said reflector reflecting said flashlight emitted from said flash tube so as to tend forwards;

a transparent protector attached to a front side of said reflector for determining a lighting distribution; and a regulate portion formed on a rear face of said protector for deflecting a part of said flashlight tending toward a center portion of said photographic area into said outsides of said photographic area, said regulate portion extends into said reflector.

4. A lens-fitted photo film unit claimed in claim 3, wherein said regulate portion is a plate protuberance extending on said projection axis toward said flash tube, and a part of said flashlight emitted from said flash tube is reflected on said plate protuberance.

5. A lens-fitted photo film unit claimed in claim 4, wherein an end of said plate protuberance is wedge-shaped.

6. A lens-fitted photo film unit claimed in claim 4, wherein said plate protuberance has upper and lower faces inclined to said projection axis so as to become thinner towards said end.

7. A lens-fitted photo film unit claimed in claim 6, wherein said end of said plate protuberance is provided with a first groove having a V-shaped form.

8. A lens-fitted photo film unit claimed in claim 7, wherein a second groove is formed on a front face of said protector into said plate protuberance.

9. A lens-fitted photo film unit claimed in claim 3, wherein said regulate portion is composed by a reflection material, and a part of said flashlight emitted from said flash tube is reflected on said regulate portion.

10. A lens-fitted photo film unit with a flash device, in which a filmstrip is preloaded, comprising:

an exposure section for exposing a filmstrip; and a flashlight projector included in said flash device, for projecting a flashlight so that an intensity of said flashlight may be at the maximum in outsides of the photographic area, wherein said flashlight projector comprises:

a flash tube for emitting said flashlight;

a reflector having nearly half elliptical shape, in an inner side of said reflector said flash tube being disposed on a projection axis of said flash device, said reflector reflecting said flashlight emitted from said flash tube so as to tend forwards; and a protector being attached to a front side of said reflector, for determining a distribution of said flashlight, wherein a distance between said protector and said flash tube is larger than an opening width of said reflector, and wherein said outsides are located at least one of above and below said photographic area.

11. A lens-fitted photo film unit with a flash device, in which a filmstrip is preloaded, comprising:

an exposure section for exposing a filmstrip; and a flashlight projector included in said flash device, for projecting a flashlight so that an intensity of said flashlight may be at the maximum in outsides of the photographic area, wherein said outsides are located at least one of above and below said photographic area, and wherein said flashlight projected by said flashlight projector is at the maximum only above or below said photographic area.

12. A lens-fitted photo film unit claimed in claim 11, wherein a projection axis of said flashlight projector is inclined to upwards or downwards with respect of a photographic axis.

13. A method of a flash lighting of a lens-fitted photo film unit, comprising steps of:

projecting a flashlight from a flashlight projector;

deflecting a part of said flashlight tending toward a center portion of a photographic area into outsides of a photographic area by a regulate portion formed on a rear face of a protector of the flashlight projector, wherein said outsides are at least one of above and below said photographic area; and illuminating a scene such that an intensity of said flashlight may be at the maximum in outsides of said photographic area within said scene.

* * * * *